April 9, 1935. L. A. NELSON 1,997,010
RACING LURE
Filed Aug. 21, 1933
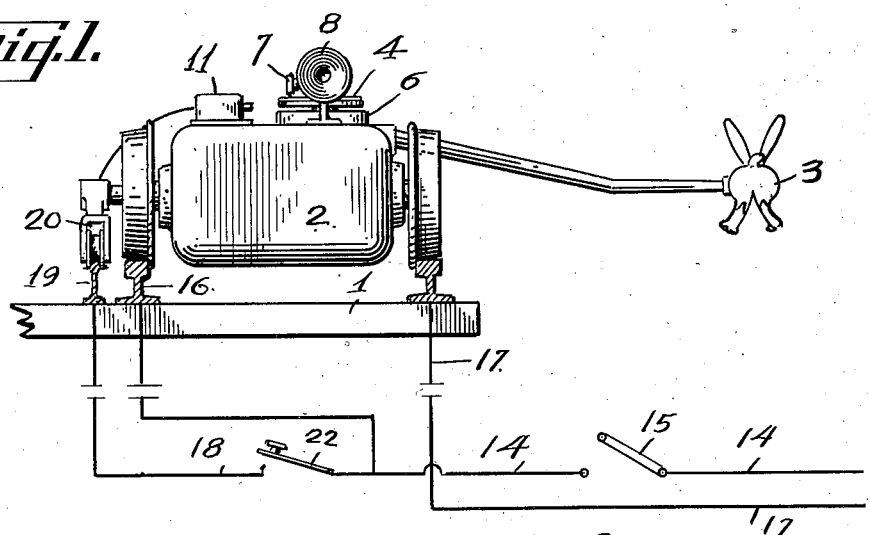
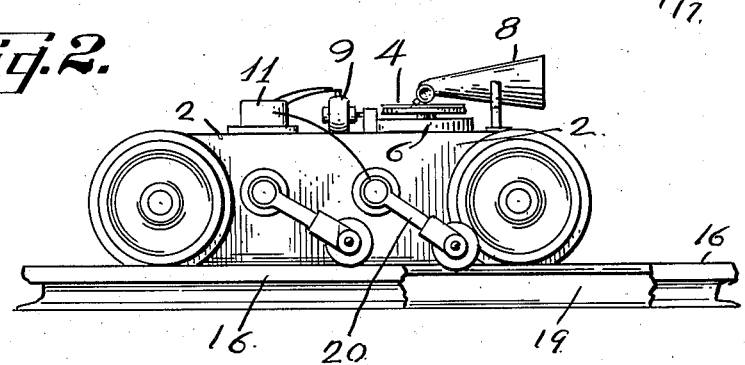
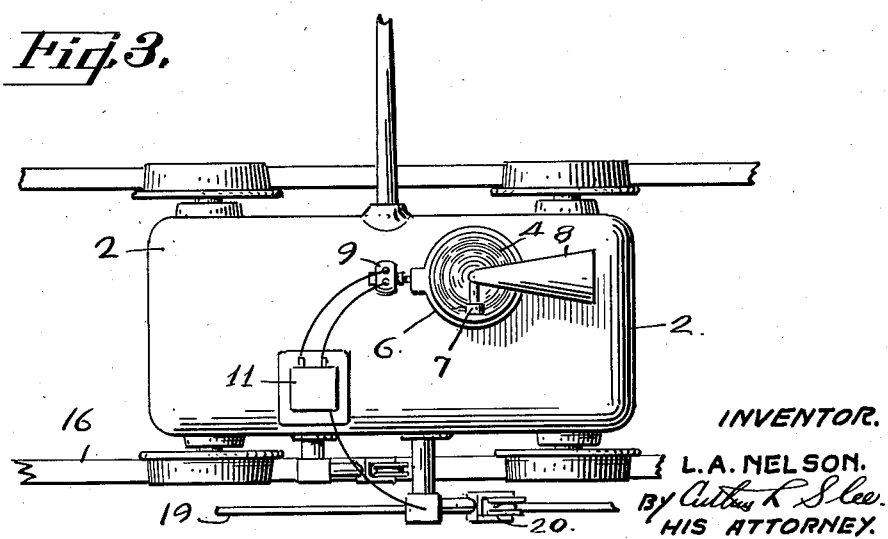
INVENTOR.
L. A. NELSON.
BY Arthur L. Lee
HIS ATTORNEY.

Patented Apr. 9, 1935

1,997,010

UNITED STATES PATENT OFFICE 1,997,010

RACING LURE

Lloyd A. Nelson, San Francisco, Calif.

Application August 21, 1933, Serial No. 686,128

3 Claims. (Cl. 272—4)

My invention relates to improvements in racing lures wherein means for reproducing or simulating the natural cry of a quarry in distress or being pursued, operates in conjunction with a mechanical lure for carrying a representation of said quarry around a race-track in advance of the pursuing animals; and wherein said simulation or reproduced cry is actuated from a point remote from the lure and independently of the mechanical lure.

The primary object of the present invention is to provide a new and improved mechanical racing lure.

Another object is to provide a mechanical racing lure having improved means for reproducing or simulating the cry of a quarry being pursued, as well as for carrying said lure around a race-track.

A further object is to provide a new and improved device of the character set forth having improved means for adding further stimulation to the pursuing animals.

A still further object of the invention is to provide the mechanical lure with a phonographic record containing a reproduction of the natural cry of a quarry being pursued; means for actuating said record independently of the actuation of the mechanical lure; and means for controlling the record actuating mechanism independently of and remote from the mechanical lure.

I accomplish these and other objects by means of the device, one form of which is disclosed in the drawing forming a part of the present application, wherein like characters of reference are used to designate similar parts throughout the specification and drawing, and in which—

Fig. 1 is a transverse sectional view of the lure track, disclosing an end elevation of the lure and my improvement attached thereto, as well as a circuit disclosing one controlling means;

Fig. 2 is a side elevation of Fig. 1; and

Fig. 3 is a plan view of the device.

Referring to the drawing, the numeral 1 is used to designate the track upon which the mechanical truck or device 2 is carried around the race-track, not shown, in the usual well known manner.

The device carries the usual lure 3, which is generally a representation of the quarry being pursued, in order to add stimulus, or an objective, to induce energetic pursuit and therefore better racing of the pursuing animals.

A phonographic record 4, upon which has been reproduced a record of the natural cry of the lure 3, is mounted upon a suitable resilient cushioning device or shock-absorber 6, of any suitable type, such, for instance, as a cushion of soft rubber or other suitable device.

A suitable reproducer 7 engages the record 4 in the usual manner and is provided with a horn 8 turned preferably toward the rear of the device or toward the animals pursuing the lure 3.

In this form of the invention, the record 4 is actuated by means of a suitable motor 9 electrically connected to a reduction element 11 as the current supplied to operate the mechanical device 2 is generally too strong for the operation of the more delicate or lighter motor required for the operation of the record 4.

The current for actuating the mechanical device 2 is carried, in the usual manner, by a conductor 14, from a suitable source of electrical energy, containing a suitable switch 15, to one of the rails 16, through the actuating mechanism, not shown, as it forms no part of the present invention, of the device 2.

After passing through the device 2, the current returns to its source through the opposite rail and through the usual conductor 17.

A conductor 18 leads a portion of the current from the conductor 14 to a third rail 19 from whence it passes through a suitable trolley 20 to the resistance 11, and thence to the motor 9. From the motor 9 the current may be grounded to the device 2 from which it returns to its source through the conductor 17.

The conductor 18 is provided with a suitable switch 22 located at a point preferably remote from the device 2 and the lure 3 whereby said current may be interrupted or caused to flow in order that the record actuating mechanism may be controlled at will.

In operation:

When the mechanical device 2 carrying the lure 3 is in motion, it frequently occurs that the view of the animals pursuing the lure 3 is obstructed, such, for instance, as on curves of the track, not shown, or when the pursuing animals "break". To add further stimulus to the pursuing animals at such a time, or at any time, an operator closes the switch, intermittently or otherwise, and thereby actuates the record actuating mechanism or motor 9 which will cause the record 4 to reproduce the natural cry of the lure.

Thus, an observing operator may add stimulus to the race and induce further energetic racing effort on the part of the pursuing animals and increase the racing interest or excitement.

While I have disclosed a phonographic record for reproducing the natural cry of the lure 3, it is obvious that other mechanical equivalents may be used with equal effect, such, for instance, as an electrical reproducing system where the actual reproduction is at a point remote from the lure, but carried thereto thru the medium of the usual conductors, rails and trolleys.

Having thus described my invention, what I claim as new and desire to secure by Letters Patent is—

1. A racing lure comprising the combination with a mechanical device for carrying a representation of a quarry being pursued around a race-track, of means carried by said mechanical device for simulating the cry of said quarry; and means for controlling said simulating means from a point remote from the quarry.

2. A racing lure comprising the combination with a mechanical device for carrying a representation of a quarry being pursued around a race-track, of means carried by said mechanical device for simulating the cry of said quarry; and means for actuating said simulating means at will, and from a point remote from the carrying means while said carrying means is in motion.

3. A racing lure comprising the combination with a mechanical device for carrying a representation of a quarry being pursued around a race-track, of phonographic means for reproducing the cry of said quarry; actuating means mounted upon said carrying device for actuating said phonographic means; and means for controlling said actuating means from a stationary point remote from said carrying means and said lure.

LLOYD A. NELSON.